US012518218B2

(12) United States Patent
Rajagopalan et al.

(10) Patent No.: US 12,518,218 B2
(45) Date of Patent: Jan. 6, 2026

(54) DYNAMICALLY SCALABLE MACHINE LEARNING MODEL GENERATION AND RETRAINING THROUGH CONTAINERIZATION

(71) Applicant: SAP SE, Walldorf (DE)

(72) Inventors: Nithya Rajagopalan, Bangalore (IN); Panish Ramakrishna, Bangalore (IN); Ashutosh Patel, Bangalore (IN); Ranjith Pavanje Raja Rao, Bangalore (IN); Mayank Kamboj, Bangalore (IN); Arjun Swami, Bangalore (IN)

(73) Assignee: SAP SE, Walldorf (DE)

( * ) Notice: Subject to any disclaimer, the term of this patent is extended or adjusted under 35 U.S.C. 154(b) by 1279 days.

(21) Appl. No.: 17/223,859

(22) Filed: Apr. 6, 2021

(65) Prior Publication Data
US 2022/0318687 A1 Oct. 6, 2022

(51) Int. Cl.
| | | |
|---|---|---|
| *G06N 20/20* | (2019.01) | |
| *G06F 9/455* | (2018.01) | |
| *G06F 9/50* | (2006.01) | |
| *G06F 18/23213* | (2023.01) | |
| *G06N 5/043* | (2023.01) | |

(52) U.S. Cl.
CPC ......... *G06N 20/20* (2019.01); *G06F 9/45558* (2013.01); *G06F 9/5077* (2013.01); *G06F 18/23213* (2023.01); *G06N 5/043* (2013.01); *G06F 2009/4557* (2013.01)

(58) Field of Classification Search
CPC .. G06N 20/20; G06N 5/043; G06F 18/23213; G06F 9/45558; G06F 9/5077; G06F 2009/4557; G06F 9/4881; G06F 9/5044
See application file for complete search history.

(56) References Cited

U.S. PATENT DOCUMENTS

| | | | |
|---|---|---|---|
| 9,122,562 B1 * | 9/2015 | Stickle | G06F 9/5077 |
| 10,452,992 B2 | 10/2019 | Lee et al. | |
| 11,397,794 B1 * | 7/2022 | Baghani | G06F 21/44 |
| 11,635,988 B1 * | 4/2023 | Gao | G06N 3/045 |
| | | | 718/102 |
| 2013/0031489 A1 | 1/2013 | Gubin et al. | |

(Continued)

OTHER PUBLICATIONS

Zhang et al., "Finding the Big Data Sweet Spot: Towards Automatically Recommending Configurations for Hadoop Clusters on Docker Containers," 2015 IEEE International Conference on Cloud Engineering (Year: 2015).*

(Continued)

*Primary Examiner* — Miranda M Huang
*Assistant Examiner* — Yao David Huang
(74) *Attorney, Agent, or Firm* — SCHWEGMAN LUNDBERG & WOESSNER, P.A.

(57) ABSTRACT

In an example embodiment, a model generation component may additionally assign various cloud resources to a machine learned model so that the training or retraining of the model can be performed using these resource. The containers may be weighted to handle model generation work of different weight. Having one single configuration for a container responsible for generating all models leads to overuse of hardware resources because machine learning algorithms are very resource intensive, and thus dynamically selecting the weight improves hardware utilization.

20 Claims, 8 Drawing Sheets

(56) References Cited

U.S. PATENT DOCUMENTS

| | | | |
|---|---|---|---|
| 2018/0018587 A1* | 1/2018 | Kobayashi | G06N 20/00 |
| 2018/0315494 A1 | 11/2018 | Kolde et al. | |
| 2019/0155633 A1* | 5/2019 | Faulhaber, Jr. | G06N 5/04 |
| 2020/0073717 A1* | 3/2020 | Hari | G06F 9/5061 |
| 2021/0117217 A1* | 4/2021 | Croteau | G06F 11/3409 |
| 2022/0058512 A1 | 2/2022 | Noorizadeh et al. | |
| 2022/0180178 A1 | 6/2022 | Tasinga et al. | |
| 2022/0284351 A1* | 9/2022 | Wetherbee | H04L 41/16 |
| 2022/0292303 A1* | 9/2022 | Cao | G06F 9/505 |
| 2022/0318686 A1 | 10/2022 | Rajagopalan et al. | |
| 2023/0013340 A1* | 1/2023 | Wu | G06N 3/04 |

OTHER PUBLICATIONS

Wang et al., "Toward Accurate Platform-Aware Performance Modeling for Deep Neural Networks," arXiv:2012.00211v1 [cs.LG] Dec. 1, 2020 (Year: 2020).*

Yeung et al., "Towards GPU Utilization Prediction for Cloud Deep Learning," HotCloud'20: Proceedings of the 12th USENIX Conference on Hot Topics in Cloud Computing (2020) (Year: 2020).*

Shi et al., "Optimization of K-NN by feature weight Learning," Proceedings of the Fourth International Conference on Machine Learning and Cybernetics, Guangzhou, Aug. 18-21, 2005 (Year: 2005).*

"U.S. Appl. No. 17/223,796, Non Final Office Action mailed May 10, 2024", 64 pgs.

"U.S. Appl. No. 17/223,796, Examiner Interview Summary mailed Jul. 2, 2024", 3 pgs.

"U.S. Appl. No. 17/223,796, Response filed Jul. 11, 2024 to non Final Office Action mailed May 10, 2024", 12 pgs.

"U.S. Appl. No. 17/223,796, Final Office Action mailed Sep. 27, 2024", 51 pgs.

"U.S. Appl. No. 17/223,796, Response filed Nov. 21, 2024 to Final Office Action mailed Sep. 27, 2024", 12 pgs.

"U.S. Appl. No. 17/223,796, Examiner Interview Summary mailed Nov. 22, 2024", 3 pgs.

"U.S. Appl. No. 17/223,796, Non Final Office Action mailed Mar. 10, 2025", 54 pgs.

"U.S. Appl. No. 17/223,796, Examiner Interview Summary mailed Mar. 31, 2025", 3 pgs.

"U.S. Appl. No. 17/223,796, Response filed Apr. 9, 2025 to Non Final Office Action mailed Mar. 10, 2025", 14 pgs.

* cited by examiner

300

| AUTO TRAIN ENABLE/DISABLE | MORE TOOLS |
|---|---|
| 👊 MASS ENABLE AUTO TRAIN | 👎 MASS DISABLE AUTO TRAIN |

SELECTED MODEL CONFIGURATION LIST FOR MASS ENABLE/DISABLE

CLICK ON MASS ENABLE/DISABLE TO MAKE THE CHANGES PERSISTENT

MODEL CONFIGURATION LIST

🔍 GLOBAL SEARCH

| CHECK ALL | REALM | TENANT ID | AUTO TRAIN |
|---|---|---|---|
| | COLUMN SEARCH | COLUMN SEARCH | COLUMN SEARCH |
| ☐ | SYSTEM | 2 | NO |
| ☐ | ACCACWSAP | 3 | NO |
| ☐ | S4SVALL | 5 | NO |
| ☐ | SVHANA | 7 | NO |
| ☐ | S4ALL | 6 | NO |
| ☐ | TEST | 1 | NO |
| ☐ | S4ALLAUTOMIG | 8 | NO |
| ☐ | BASF | 4 | NO |

DYNAMICALLY SCALABLE MACHINE LEARNING MODEL GENERATION AND RETRAINING THROUGH CONTAINERIZATION

CROSS-RELATION TO RELATED APPLICATIONS

This application is related to co-pending patent application entitled "DYNAMICALLY SCALABLE MACHINE LEARNING MODEL GENERATION AND DYNAMIC RETRAINING," filed the same day as the present application, and is hereby incorporated herein by reference in its entirety.

TECHNICAL FIELD

This document generally relates to systems and methods for use in machine learning. More specifically, this document relates to dynamically scalable machine learning model generation and retraining through containerization.

BACKGROUND

Companies often use machine learning to train machine learned models to perform many different types of tasks, including recommendations, predictions, classifications, etc. As companies move more and more functions to cloud-based services, it has become possible for those cloud-based services to provide an environment where the machine learned models can be trained and used in the cloud.

BRIEF DESCRIPTION OF DRAWINGS

The present disclosure is illustrated by way of example and not limitation in the figures of the accompanying drawings, in which like references indicate similar elements.

FIG. 3 is a screen capture illustrating an auto train mass enable/disable feature in accordance with an example embodiment.

DETAILED DESCRIPTION

Figure 1:
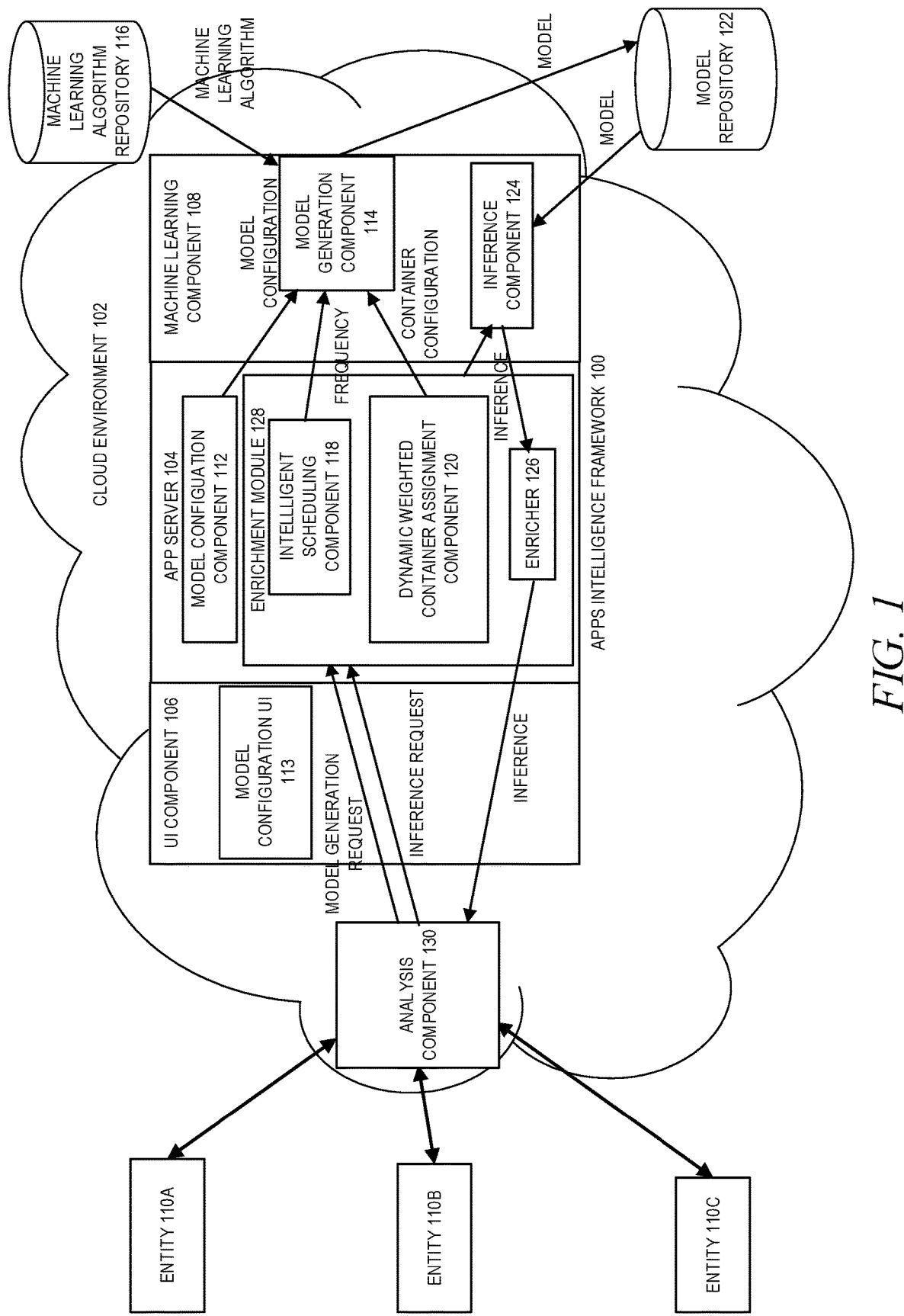
FIG. 1 is a block diagram illustrating an apps intelligence framework in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a framework for continuous and automatic machine learned model generation and retraining is provided that can self-configure dynamically.

An issue that arises in cloud-based machine learned model training, retraining, and usage is that the cloud resources are shared among multiple different entities (typically companies). This issue actually causes multiple technical problems, especially as such cloud solutions are scaled to include hundreds or even thousands of entities. One such technical problem is that bottlenecks can occur based on timing of resource usage. Often entities will set retraining schedules that retrain their respective models at preset intervals (e.g., monthly, weekly, etc.). This schedule is established without regard for how much new training data has been obtained since the last training point, resulting in unnecessary retraining operations. For example, a company may think it needs weekly retraining for a particular model, but significant amounts of new training data may only be obtained every three weeks or so. Thus, retraining the model weekly uses cloud resources unnecessarily. Bottlenecks can also occur when such unnecessary retraining operations occur on the same day as retraining of models from other entities. For example, for entities who set a retraining schedule at monthly intervals, it might be common for such retraining to occur on the first day of the month, which creates issues when multiple companies are all attempting to retrain on the same day.

This can even occur on a daily basis. On some days, a customer may create thousands of pieces of training data but on other days the amount will be much lower. In an example embodiment, on the days with less new data, the model generation frequency can be reduced.

Another technical problem involves resource utilization. Companies often want the best/fastest resources assigned to their models but not all models require such resources, and even for those that do, they don't require such resources all the time. In an example embodiment, on some days, when thousands of pieces of training data are being used for retraining, a high level of resources may be dynamically assigned, but on days with less new data, the level of resources can be reduced.

In an example embodiment an applications (apps) intelligence framework is utilized to quickly operationalize machine learned models (of different use cases, products, or applications) and take them to production through a set of predetermined pipelines. These pipelines include data acquisition, model creation, model inference/prediction, model management, and prediction application program interfaces (APIs). The data acquisition pipeline includes adapters to pull data from various sources, as per the requirements of the machine learning algorithm. The model creation pipeline includes a framework to create a model from the acquired data. The model inference/prediction pipeline loads the models to memory for inference. The model management pipeline provides a centralized server to view and manage the model inventors. The prediction APIs then host the model in the web server to provide prediction on-demand.

FIG. 1 is a block diagram illustrating an apps intelligence framework 100 in accordance with an example embodiment. The apps intelligence framework 100 operates in a cloud environment 102. The apps intelligence framework 100 includes an app server 104, a user interface component 106, and a machine learning component 108. Multiple entities 110A-110C communicate with the apps intelligence framework 100 to create, train, retrain, and use (perform inferences with) machine learned models. These entities 110A-110C may each include, for example, enterprise resource planning (ERP) systems and analysis systems (not pictured) that generate various requests to the apps intelligence framework 100, such as model generation requests and inference requests.

The app server 104 may include a model configuration component 112 that can be accessed via a model configuration user interface 113 in the user interface component 106 to allow an entity 110A-110C to configure a model for the entity's specific use case. This may include, as will be seen later, specifying one or more filters on the training data. This configuration is then passed to a model generation component 114 in the machine learning component 108, which acts to generate the specific model for the entity's use case using the configuration. This is performed by training the model using a machine learning algorithm and training data obtained from the entity 110A-110C (filtered by the appropriate filters). Information about the machine learning algorithms and the locations and adapters to use to obtain the data may be stored in a machine learning algorithm repository 116.

An intelligent scheduling component 118 may then be used to schedule retraining of the specific model at particular intervals. Notably, the intelligent scheduling component 118 is itself a machine learned model (in one example embodiment a neural network) that is trained to dynamically output a training interval for a particular model based on various features. These features may include (1) the type of the algorithm; (2) the amount of new training data; (3) the amount of variation in the training data; and (4) feedback analysis. The type of the algorithm means that certain types of algorithms, such as convolutional neural network or higher polynomial algorithms, can be trained less frequently (because such algorithms are more generalized and have less bias). On the other hand, simplistic models such as decision tree models need to be retrained more frequently.

As to the amount of new training data, if there are fewer new samples, it is less important to retrain frequently. On the other hand, if there is a log of training data being generated, it is more important to retrain frequently. As such, the intelligent scheduling component 118 may perform an automatic analysis of the training file to periodically check for new labels/additional training data for labels with very few records (compared with the previous model's training data).

As to the amount of variation in the training data, a random sampling may be performed to check for the percentage change of training data for each label. If a significant change in the distribution pattern is observed, retraining frequency may be adjusted higher. This may occur, for example, when a new source system is added to the entity's realm as the pattern of data may differ significantly from before, which may trigger a need for retraining.

Finally, for feedback analysis, if the trend of feedbacks change (such as the user is correcting a lot of predictions compared to historic pattern), the frequency of retraining may be increased. This may occur if the entity is frequently overriding the terms predicted by the model.

The machine learned model, such as a neural network, within the intelligent scheduling component itself may be seeded with an initial retraining frequency (for example, one specified by the entity) and then the machine learned model may dynamically tune retraining frequency based on the above features. The intelligent scheduling machine learned model may then be trained using a neural network to learn weights for each of the features and then these weights are applied to (e.g. multiplied by) the values for the features at the time when retraining frequency is examined.

The model generation component 114 may additionally assign various cloud resources to the model so that the training or retraining of the model can be performed using these resource. In an example embodiment, these resources are assigned by assigning the model to a container, such as a Docker™ container, that contains all the assigned resources. These resources may include, for example, central processing units (CPUs), graphics processing units (GPUs), memory (such as random access memory (RAM)), and instance count (used for parallel scaling).

In an example embodiment, the containers are weighted to handle model generation work of different weight. Having one single configuration for a container responsible for generating all models leads to overuse of hardware resources because machine learning algorithms are very resource intensive. Since the apps intelligence framework 100 is a platform for hosting various kinds of machine learning models and use cases of thousands of entity realms, it is important to optimally utilize the resources in a shared environment.

In an example embodiment, rather than a single configuration of container, multiple different configurations are provided and the model is dynamically assigned to the container configuration that makes the most sense at the time. In an example embodiment, these configurations include extra large, large, and medium, to cater to different levels of model processing. Each of these container groups has different resource allocations with respect to CPUs, GPUs, memory, and instance count.

A dynamic weighted container assignment component 120 therefore dynamically determines which type of container configuration (extra large, large, and medium) to assign to a particular model's training and retraining. As with the intelligent scheduling component 118, the dynamic weighted container assignment component 120 may itself also be a machine learned model trained to output a selection of the proper container configuration for a model to be trained or retrained, although rather than a neural network in this case the machine learning algorithm used to train the dynamic weighed container assignment machine learned model may be a clustering algorithm such as a K-nearest neighbor algorithm.

Features used by the dynamic weighted container assignment machine learned model may include the type of algorithm and the type of the entity's data. For the type of algorithm, a neural network with lots of layers and features, for example, may utilize a lot of memory to store the vectors and matrices, but the resource needs of a decision tree—based model would be on the lower end of the spectrum. As to the type of entity data, for some use cases, even within the same algorithm, the model training resource requirements can still vary a lot depending on the data, including based on the volume of data generated and number of unique features. The information used here may include historic resource utilization data of model generation, allowing the resource allocated for running model training to be further optimized.

As with the intelligent scheduling machine learned model, the dynamic weighted container assignment machine learned model may be initially tagged with a manual tag for the container assignment, and then may switch over to automatic tagging once sufficient historic data (of metadata about the model generation runs) has been gathered. Thus, for example, a model may be initially marked with a large container size, resulting in any Docker container in the pool tagged with "large" being able to pick up jobs from any realm for that use case, but as metrics from each run are captured, this container size will be auto tuned based on individual realms. If the realm is small with a small number of training data, the corresponding model may generate fast with fewer CPU/memory requirements, and thus the next time that particular model is retrained it may have been assigned a smaller (e.g., "medium") container size.

The result is that the intelligent scheduling component 118 and the dynamic weighted container assignment component 120 tag an initial frequency and container configuration to the model, which the model generation component 114 uses during initial training and potentially continues to use until dynamically changed. At later times, when retraining of the model is considered, the intelligent scheduling component 118 and the dynamic weighted container assignment component 120 both tune their previous frequency and container configuration outputs, potentially altering them for use by the model generation component 114 on subsequent retrainings.

The training and retraining of the model by the model generation component 114 produces a trained model that is stored in the model repository 122. Upon receiving an inference request, the inference component 124 then retrieves the corresponding model from the model repository 122 and performs its inference-stage calculations. This includes applying the model to current features for the data on which the inference is to be performed. As described earlier, the inference may be any of many different types of machine learned model inferences, such as predictions, classifications, or recommendations. Whatever the output inference is, it may then be passed to an enricher 126 that may enrich the inference with post-processing details (such as adding specific labels to the output or performing additional calculations using the output). The inference may then be output.

It should be noted that in some example embodiments, the intelligent scheduling component 118, dynamic weighted container assignment component 120, and enricher 126 may all be part of an enrichment module 128 specific to the model in question. While these components may be common across many different enrichment modules 128, other aspects of the enrichment module 128 not pictured may be more customized for the individual model.

Additionally, in some example embodiments, the entities 110A-110C communicate with the apps intelligence framework 100 indirectly, through an analysis component 130. The analysis component 130 creates the model generation requests and inference requests based on input received from the entities 110A-110C.

Furthermore, the UI component 106 may contain other user interface aspects not pictured in this diagram. This might include model generation monitoring, model management, inference configuration, and inference monitoring.

Figure 2:
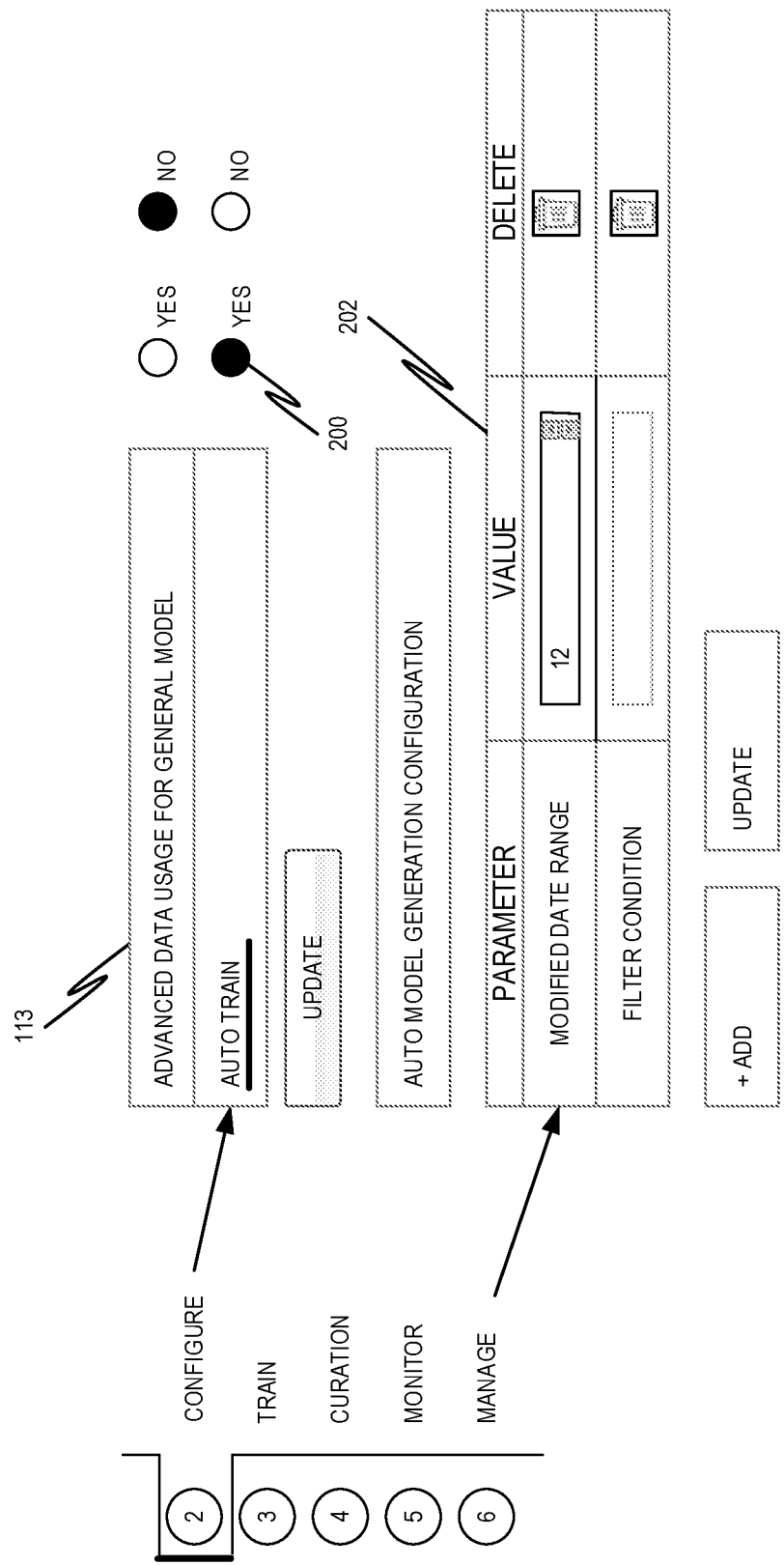
FIG. 2 is a screen capture illustrating a model configuration user interface in accordance with an example embodiment.

FIG. 2 is a screen capture illustrating a model configuration user interface 113 in accordance with an example embodiment. Here, a user may select section 200 to enable a particular model to be auto trained. The model configuration user interface 113 then updates the frequency and container configuration automatically as described earlier. The model configuration user interface 113 also provides a section 202 where a user can enter various parameters, such as filters, on the training data. Here, for example, the user has indicated that a date range of 12 should be applied to the training data, meaning the training data should cover the previous 12 days. Other filter conditions may also be applied to filter the training data. Thus, this establishes the model configuration for the model.

FIG. 3 is a screen capture illustrating an auto train mass enable/disable feature 300 in accordance with an example embodiment. Here, a user may provide a single point check at a system level which can toggle auto train for many entities/realms at once with one click. This can be useful to deal with occasional technical problems such as requests to the server getting queued up due to a number of requests already being in the scheduled state, such as due to frequency of model generation, size of the requests, lack of underlying resources. In such cases, an administrator may automatically turn off auto train for many entities/realms at once, and then once the problems are addressed turn them all back on at once.

Figure 4:
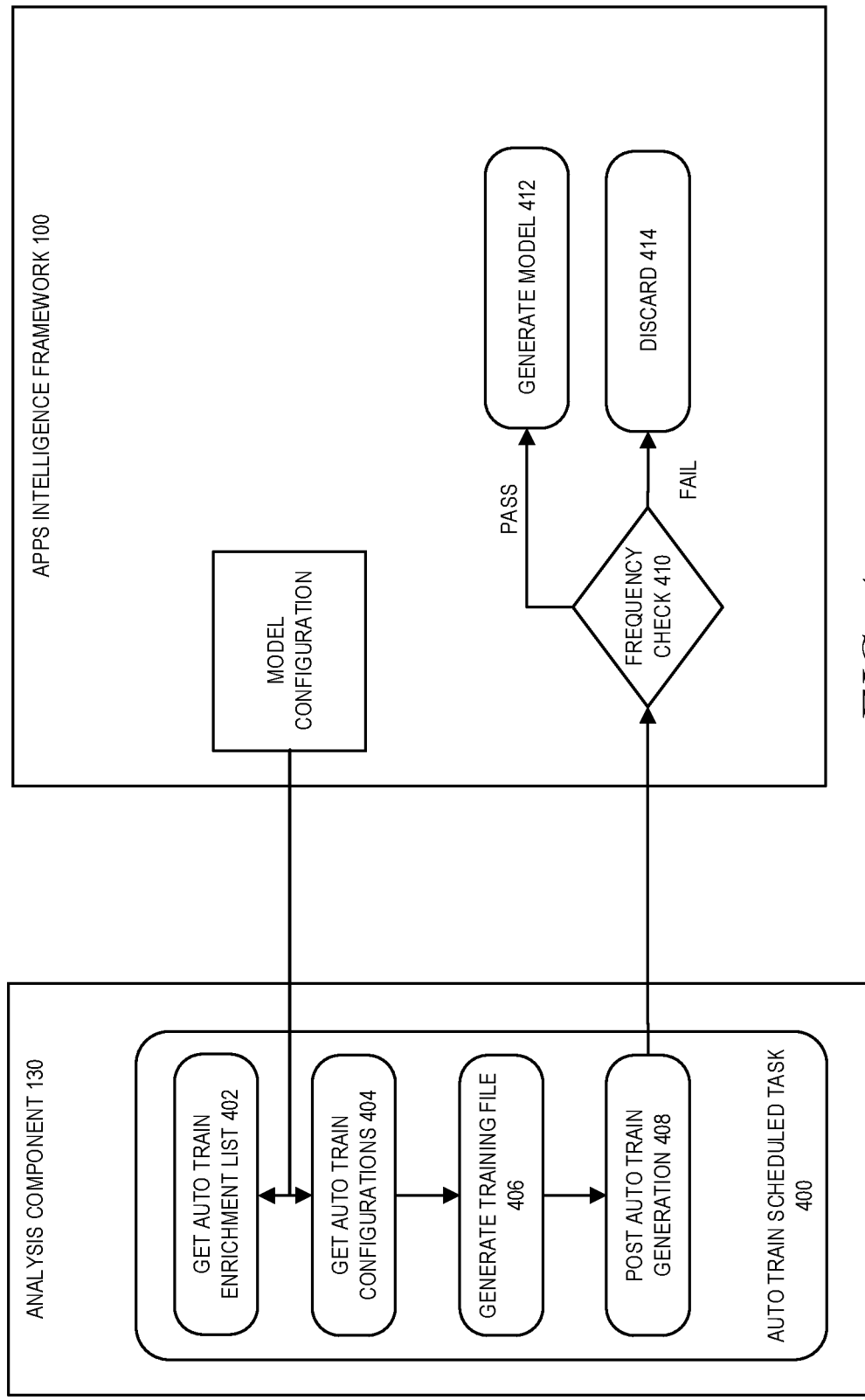
FIG. 4 is a block diagram illustrating an auto train scheduled task in accordance with an example embodiment.

In an example embodiment, the analysis component 130 may include an auto train scheduled task. FIG. 4 is a block diagram illustrating an auto train scheduled task 400 in accordance with an example embodiment. The auto train scheduled task 400 may be run periodically, such as daily. The auto train scheduled task 400 may include sub-tasks to get auto train enrichment lists 402, get auto train configurations 404, generate a training file 406, and post auto train model generation 408. The auto train enrichment lists 402 sub-task and the get auto train configurations 404 task may utilize a model configuration from the apps intelligence framework 100. Once the realm is eligible for a new model (model retraining), then the auto train generation is posted, which essentially posts the training file to the apps intelligence framework 100, which has its own task 410 to perform a frequency check. This checks the auto train generation frequency recommended by the intelligent scheduling component 118 against the time created of the "latest" model. If enough time has passed since that time created (consistent with the frequency), then at 412 the model may be generated. Otherwise, the task may be discarded at 414.

Figure 5:
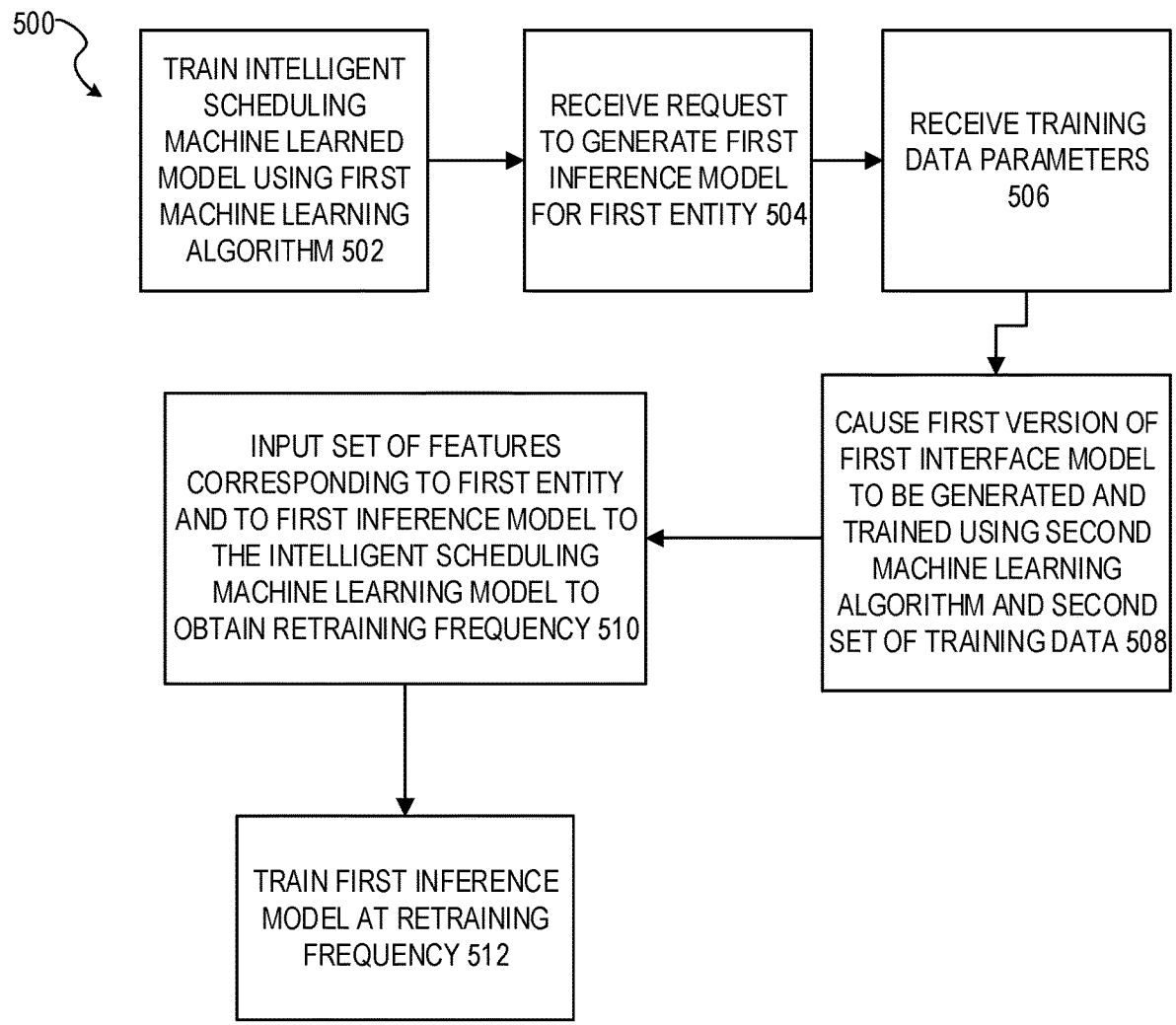
FIG. 5 is a flow diagram illustrating a method in accordance with a first example embodiment.

FIG. 5 is a flow diagram illustrating a method 500 in accordance with a first example embodiment. At operation 502, an intelligent scheduling machine learned model is trained using a first machine learning algorithm. The training comprises obtaining a first set of training data and passing the first set of training data through the machine learning algorithm to learn a coefficient for each of a plurality of features of the training data, the intelligent scheduling machine learned model being trained to output a retraining frequency for a combination of an entity and an inference model. The intelligent scheduling machine learned model may be, for example, a neural network. At operation 504, a request to generate a first inference model for a first entity of a plurality of entities corresponding to a cloud environment is received at an application server in the cloud environment. The first entity may be, for example, a group of users. At operation 506, training data parameters for the first inference model are received at the application server. At operation 508, a first version of the first inference model is caused to be generated and trained using a second machine learning algorithm and a second set of training data. This may include filtering the second set of training data based on the training data parameters.

At operation 510, a set of features corresponding to the first entity and to the first inference model are input to the intelligent scheduling machine learned model to obtain a retraining frequency for the first inference model. The set of features may include information about a type associated with the second machine learning algorithm, an amount of new training data received since a prior training or retraining of the first inference model, an amount of change in variation in training data since a prior training or retraining of the first inference model and/or a trend of user feedback to inferences produced by the first inference model. At operation 512, the first inference model is trained at retraining frequency. Operations 510 and 512 may be repeated for each subsequent version of the first inference model, causing a different retraining frequency to be output and used.

Figure 6:
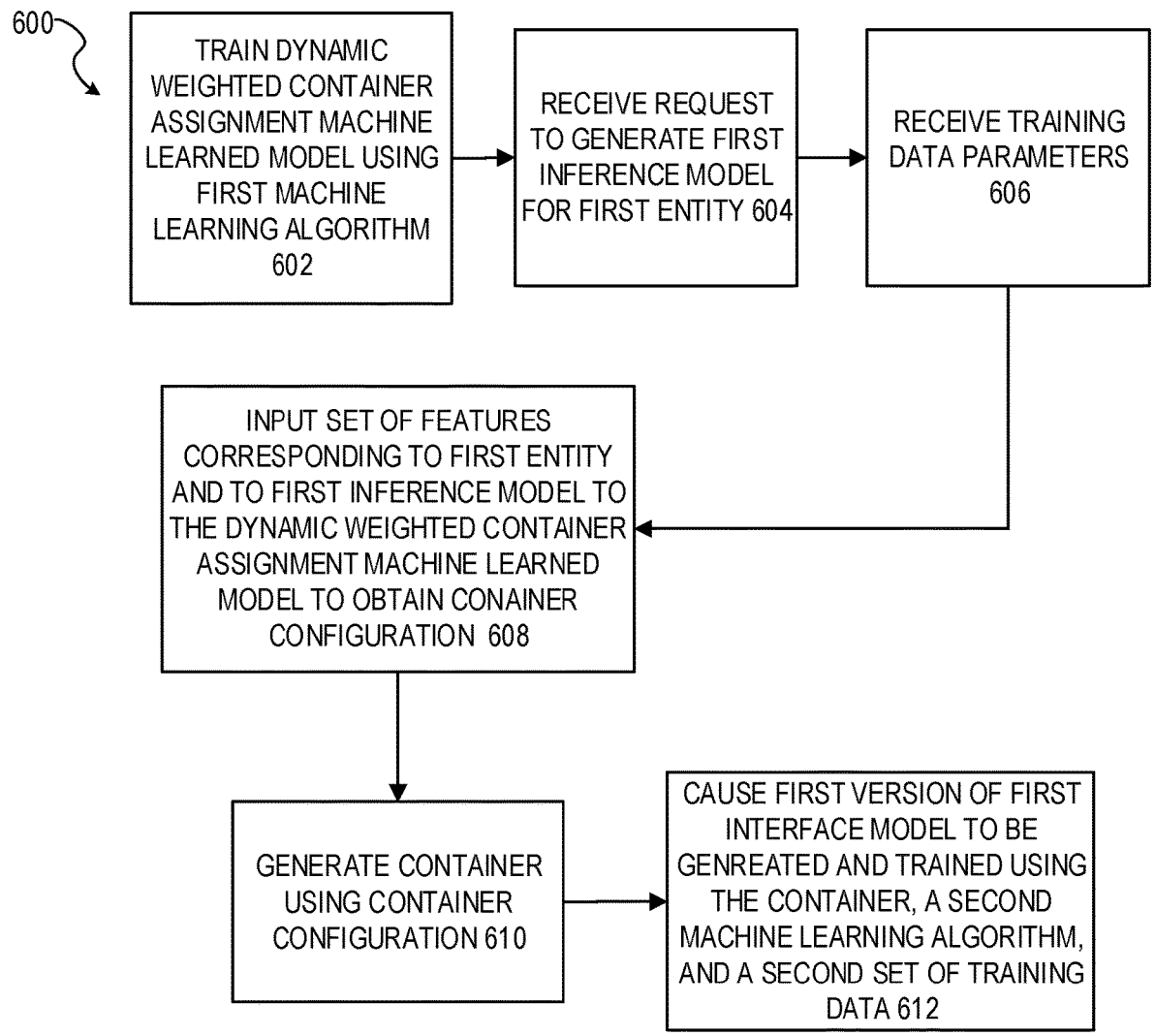
FIG. 6 is a flow diagram illustrating a method in accordance with a second example embodiment.

FIG. 6 is a flow diagram illustrating a method 600 in accordance with a second example embodiment. At operation 602, a dynamic weighted container assignment machine learned model is trained using a first machine learning algorithm. The training comprises obtaining a first set of training data and passing the first set of training data through the machine learning algorithm to learn a coefficient for each of a plurality of features of the training data, the dynamic weighted container assignment machine learned model being trained to output a container configuration for a combination of an entity and an inference machine learned model, the container configuration including a category indicating a count of each of a plurality of computing resources to be assigned to the combination of the entity and the inference model. The first machine learning algorithm may be a clustering algorithm, such as a k-nearest neighbor algorithm. At operation 604, a request to generate a first inference model for a first entity of a plurality of entities corresponding to a cloud environment is received at an application server in the cloud environment. The first entity may be, for example, a group of users.

At operation 606, training data parameters for the first inference model are received by the application server. At operation 608, a set of features corresponding to the entity and to the first inference model are input to the dynamic weighted container assignment machine learned model to obtain a container configuration for the first inference model. This may include filtering the second set of training data based on the training data parameters. The set of features may include information about a type associated with the second machine learning algorithm, an amount of new training data received since a prior training or retraining of the first inference model, an amount of change in variation in training data since a prior training or retraining of the first inference model and/or a trend of user feedback to inferences produced by the first inference model. At operation 610, a container is generated based on the obtained container configuration. At operation 612, a first version of the first inference model is caused to be generated and trained using the container, a second machine learning algorithm, and a second set of training data. Operations 610 and 612 may be repeated for each subsequent version of the first inference model, causing a different container configuration to be used for retraining than was used in a prior training of the first inference model.

In some example embodiment, the methods of FIGS. 5 and 6 are combined and work together to create dynamic frequencies and containers for retraining.

Figure 7:
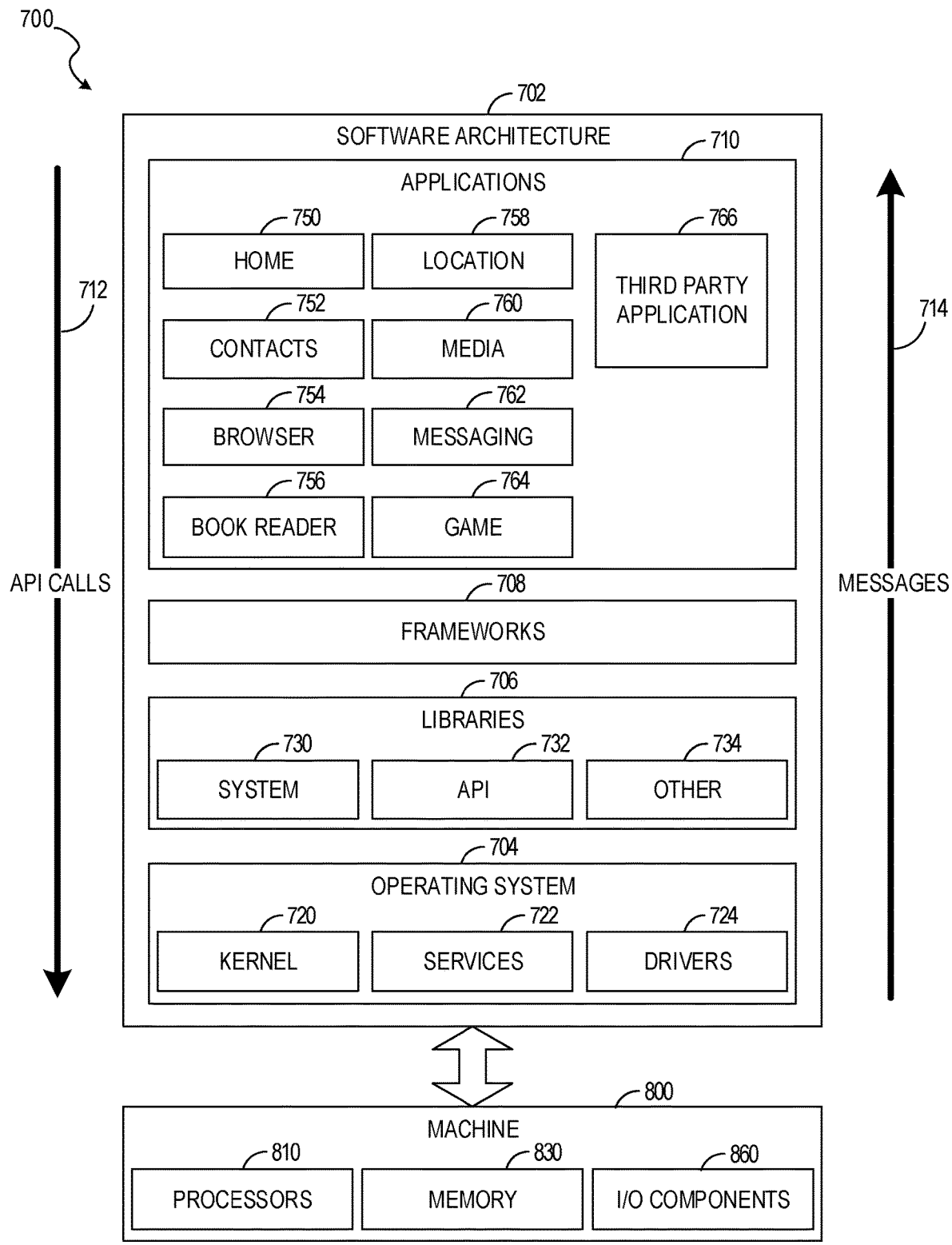
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
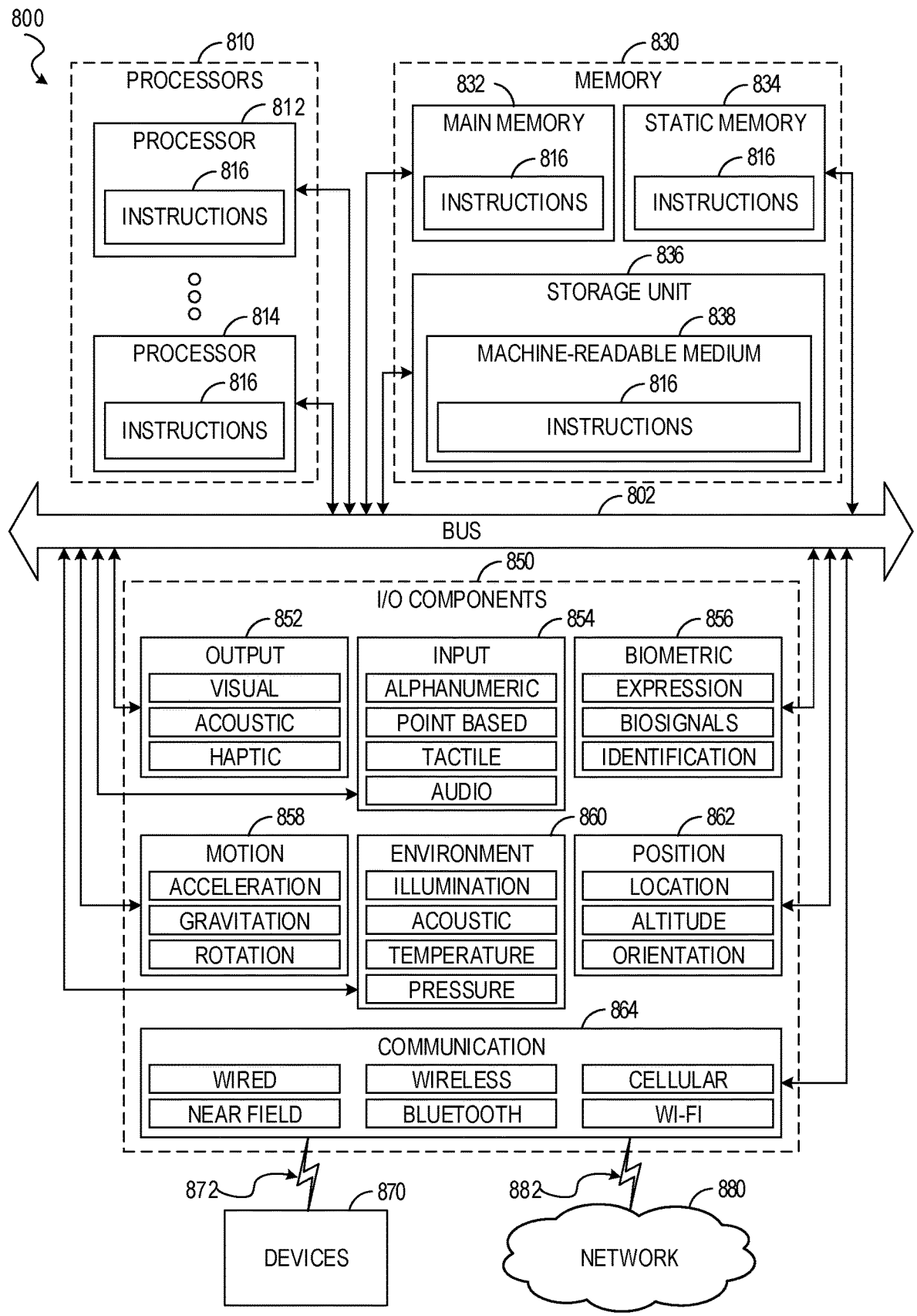
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 500 of FIG. 5. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

In view of the above described implementations of subject matter this application discloses the following list of examples, wherein one feature of an example in isolation or more than one feature of an example taken in combination and, optionally, in combination with one or more features of one or more further examples, are further examples also falling within the disclosure of this application.

Examples

Example 1. A system comprising:
at least one hardware processor; and
a computer-readable medium storing instructions that, when executed by the at least one hardware processor, cause the at least one hardware processor to perform operations comprising:
obtaining a dynamic weighted container assignment machine learned model trained using a first machine learning algorithm, the training comprising obtaining a first set of training data and passing the first set of training data through the machine learning algorithm to learn a coefficient for each of a plurality of features of the training data, the dynamic weighted container assignment machine learned model being trained to output a container configuration for a combination of an entity and an inference machine learned model, the container configuration including a category indicating a count of each of a plurality of computing resources to be assigned to the combination of the entity and the inference model;
receiving, at an application server in a cloud environment, a request to generate a first inference model for a first entity of a plurality of entities corresponding to the cloud environment;
in response to the receiving, inputting a set of features corresponding to the entity and to the first inference model to the dynamic weighted container assignment machine learned model to obtain a container configuration for the first inference model;
generating a container based on the obtained container configuration;
causing a first version of the first inference model to be generated and trained using the container, a second machine learning algorithm, and a second set of training data.

Example 2. The system of Example 1, wherein the first machine learning algorithm is a clustering algorithm.

Example 3. The system of Example 2, wherein the clustering algorithm is a k-nearest neighbor algorithm.

Example 4. The system of any of Examples 1-3, wherein the first entity is a group of users.

Example 5. The system of any of Examples 1-4, wherein the operations further comprise:
receiving, at the application server, training data parameters for the first inference model and wherein the causing the first version of the first inference model to be generated and trained further includes filtering the second set of training data based on the training data parameters.

Example 6. The system of any of Examples 1-5, further comprising repeating the inputting and generating for a subsequent version of the first inference model, causing a different container configuration to be used for retraining of the first inference model than was used in a prior training of the first inference model.

Example 7. The system of any of Examples 1-6, wherein the set of features corresponding to the entity and to the first inference model includes information about a type associated with the second machine learning algorithm.

Example 8. The system of any of Examples 1-7, wherein the set of features corresponding to the entity and to the first inference model includes information about a volume of the second set of training data.

Example 9. The system of any Examples 1-8, wherein the set of features corresponding to the entity and to the first inference model includes information about a number of unique features in the second set of training data.

Example 10. A method comprising:
obtaining a dynamic weighted container assignment machine learned model trained using a first machine learning algorithm, the training comprising obtaining a first set of training data and passing the first set of training data through the machine learning algorithm to learn a coefficient for each of a plurality of features of the training data, the dynamic weighted container assignment machine learned model being trained to output a container configuration for a combination of an entity and an inference machine learned model, the container configuration including a category indicating a count of each of a plurality of computing resources to be assigned to the combination of the entity and the inference model;
receiving, at an application server in a cloud environment, a request to generate a first inference model for a first entity of a plurality of entities corresponding to the cloud environment;
in response to the receiving, inputting a set of features corresponding to the entity and to the first inference model to the dynamic weighted container assignment machine learned model to obtain a container configuration for the first inference model;
generating a container based on the obtained container configuration;
causing a first version of the first inference model to be generated and trained using the container, a second machine learning algorithm, and a second set of training data.

Example 11. The method of Example 10, wherein the first machine learning algorithm is a clustering algorithm.

Example 12. The method of Example 11, wherein the clustering algorithm is a k-nearest neighbor algorithm.

Example 13. The method of any of Examples 10-12, wherein the first entity is a group of users.

Example 14. The method of any of Examples 10-13, further comprising:
receiving, at the application server, training data parameters for the first inference model and wherein the causing the first version of the first inference model to be generated and trained further includes filtering the second set of training data based on the training data parameters.

Example 15. A non-transitory machine-readable medium storing instructions which, when executed by one or more processors, cause the one or more processors to perform operations comprising:
obtaining a dynamic weighted container assignment machine learned model trained using a first machine learning algorithm, the training comprising obtaining a first set of training data and passing the first set of training data through the machine learning algorithm to learn a coefficient for each of a plurality of features of the training data, the dynamic weighted container assignment machine learned model being trained to output a container configuration for a combination of an entity and an inference machine learned model, the container configuration including a category indicating a count of each of a plurality of computing resources to be assigned to the combination of the entity and the inference model;

training a dynamic weighted container assignment machine learned model using a first machine learning algorithm, the training comprising obtaining a first set of training data and passing the first set of training data through the machine learning algorithm to learn a coefficient for each of a plurality of features of the training data, the dynamic weighted container assignment machine learned model being trained to output a container configuration for a combination of an entity and an inference machine learned model, the container configuration including a category indicating a count of each of a plurality of computing resources to be assigned to the combination of the entity and the inference model;

receiving, at an application server in a cloud environment, a request to generate a first inference model for a first entity of a plurality of entities corresponding to the cloud environment;

in response to the receiving, inputting a set of features corresponding to the entity and to the first inference model to the dynamic weighted container assignment machine learned model to obtain a container configuration for the first inference model;

generating a container based on the obtained container configuration;

causing a first version of the first inference model to be generated and trained using the container, a second machine learning algorithm, and a second set of training data.

Example 16. The non-transitory machine-readable medium of Example 15, wherein the first machine learning algorithm is a clustering algorithm.

Example 17. The non-transitory machine-readable medium of Example 16, wherein the clustering algorithm is a k-nearest neighbor algorithm.

Example 18. The non-transitory machine-readable medium of any of Examples 15-17, wherein the first entity is a group of users.

Example 19. The non-transitory machine-readable medium of any of Examples 15-18, wherein the operations further comprise:

receiving, at the application server, training data parameters for the first inference model and wherein the causing the first version of the first inference model to be generated and trained further includes filtering the second set of training data based on the training data parameters.

Example 20. The non-transitory machine-readable medium of any of Examples 15-19, wherein the operations further comprise:

repeating the inputting and generating for a subsequent version of the first inference model, causing a different container configuration to be used for retraining of the first inference model than was used in a prior training of the first inference model.

What is claimed is:

1. A system comprising:

at least one hardware processor; and a computer-readable medium storing instructions that, when executed by the at least one hardware processor, cause the at least one hardware processor to perform operations comprising:

obtaining a dynamic weighted container assignment machine learned model trained via training using a first machine learning algorithm, the training comprising obtaining a first set of training data and passing the first set of training data through the machine learning algorithm to learn a coefficient for each of a plurality of features of the training data, the dynamic weighted container assignment machine learned model being trained to output a container configuration for a combination of an entity and an inference machine learned model, the container configuration including a category indicating a count of each of a plurality of computing resources to be assigned to the combination of the entity and the inference model;

receiving, at an application server in a cloud environment, a request to generate a first inference model for a first entity of a plurality of entities corresponding to the cloud environment;

in response to the receiving, inputting a set of features corresponding to the entity and to the first inference model to the dynamic weighted container assignment machine learned model to obtain a container configuration for the first inference model, the set of features comprising an indication of whether a type of a second machine learning algorithm is a neural network or a non-neural network, the dynamic weighted container assignment machine learning model designed to output a different container configuration if the type of the second machine learning algorithm is a neural network than if the type of the second machine learning algorithm is a non-neural network;

generating a container based on the obtained container configuration; and causing a first version of the first inference model to be generated and trained using the container, the second machine learning algorithm, and a second set of training data.

2. The system of claim 1, wherein the first machine learning algorithm is a clustering algorithm.

3. The system of claim 2, wherein the clustering algorithm is a k-nearest neighbor algorithm.

4. The system of claim 1, wherein the first entity is a group of users.

5. The system of claim 1, wherein the operations further comprise:

receiving, at the application server, training data parameters for the first inference model and wherein the causing the first version of the first inference model to be generated and trained further includes filtering the second set of training data based on the training data parameters.

6. The system of claim 1, further comprising repeating the inputting and generating for a subsequent version of the first inference model, causing a different container configuration to be used for retraining of the first inference model than was used in a prior training of the first inference model.

7. The system of claim 1, wherein the inputting a set of features is only performed once a threshold amount of historic data of metadata about model generation runs is gathered.

8. The system of claim 1, wherein the set of features corresponding to the entity and to the first inference model includes information about a volume of the second set of training data.

9. The system of claim 1, wherein the set of features corresponding to the entity and to the first inference model includes information about a number of unique features in the second set of training data.

10. A method comprising:
obtaining a dynamic weighted container assignment machine learned model trained via training using a first machine learning algorithm, the training comprising obtaining a first set of training data and passing the first set of training data through the machine learning algorithm to learn a coefficient for each of a plurality of features of the training data, the dynamic weighted container assignment machine learned model being trained to output a container configuration for a combination of an entity and an inference machine learned model, the container configuration including a category indicating a count of each of a plurality of computing resources to be assigned to the combination of the entity and the inference model;
receiving, at an application server in a cloud environment, a request to generate a first inference model for a first entity of a plurality of entities corresponding to the cloud environment;
in response to the receiving, inputting a set of features corresponding to the entity and to the first inference model to the dynamic weighted container assignment machine learned model to obtain a container configuration for the first inference model, the set of features comprising an indication of whether a type of a second machine learning algorithm is a neural network or a non-neural network, the dynamic weighted container assignment machine learning model designed to output a different container configuration if the type of the second machine learning algorithm is a neural network than if the type of the second machine learning algorithm is a non-neural network;
generating a container based on the obtained container configuration; and
causing a first version of the first inference model to be generated and trained using the container, the second machine learning algorithm, and a second set of training data.

11. The method of claim 10, wherein the first machine learning algorithm is a clustering algorithm.

12. The method of claim 11, wherein the clustering algorithm is a k-nearest neighbor algorithm.

13. The method of claim 10, wherein the first entity is a group of users.

14. The method of claim 10, further comprising:
receiving, at the application server, training data parameters for the first inference model and wherein the causing the first version of the first inference model to be generated and trained further includes filtering the second set of training data based on the training data parameters.

15. A non-transitory machine-readable medium storing instructions which, when executed by one or more processors, cause the one or more processors to perform operations comprising:
obtaining a dynamic weighted container assignment machine learned model trained via training using a first machine learning algorithm, the training comprising obtaining a first set of training data and passing the first set of training data through the machine learning algorithm to learn a coefficient for each of a plurality of features of the training data, the dynamic weighted container assignment machine learned model being trained to output a container configuration for a combination of an entity and an inference machine learned model, the container configuration including a category indicating a count of each of a plurality of computing resources to be assigned to the combination of the entity and the inference model;
receiving, at an application server in a cloud environment, a request to generate a first inference model for a first entity of a plurality of entities corresponding to the cloud environment;
in response to the receiving, inputting a set of features corresponding to the entity and to the first inference model to the dynamic weighted container assignment machine learned model to obtain a container configuration for the first inference model, the set of features comprising an indication of whether a type of a second machine learning algorithm is a neural network or a non-neural network, the dynamic weighted container assignment machine learning model designed to output a different container configuration if the type of the second machine learning algorithm is a neural network than if the type of the second machine learning algorithm is a non-neural network;
generating a container based on the obtained container configuration; and
causing a first version of the first inference model to be generated and trained using the container, the second machine learning algorithm, and a second set of training data.

16. The non-transitory machine-readable medium of claim 15, wherein the first machine learning algorithm is a clustering algorithm.

17. The non-transitory machine-readable medium of claim 16, wherein the clustering algorithm is a k-nearest neighbor algorithm.

18. The non-transitory machine-readable medium of claim 15, wherein the first entity is a group of users.

19. The non-transitory machine-readable medium of claim 15, wherein the operations further comprise:
receiving, at the application server, training data parameters for the first inference model and wherein the causing the first version of the first inference model to be generated and trained further includes filtering the second set of training data based on the training data parameters.

20. The non-transitory machine-readable medium of claim 15, wherein the operations further comprise:
repeating the inputting and generating for a subsequent version of the first inference model, causing a different container configuration to be used for retraining of the first inference model than was used in a prior training of the first inference model.

* * * * *